(12) United States Patent
MacInnis

(10) Patent No.: US 9,131,242 B2
(45) Date of Patent: Sep. 8, 2015

(54) SYSTEM, METHOD, AND APPARATUS FOR SCALABLE MEMORY ACCESS

(75) Inventor: Alexander G. MacInnis, Ann Arbor, MI (US)

(73) Assignee: BROADCOM CORPORATION, Irvine, CA (US)

( * ) Notice: Subject to any disclaimer, the term of this patent is extended or adjusted under 35 U.S.C. 154(b) by 936 days.

(21) Appl. No.: 12/367,338

(22) Filed: Feb. 6, 2009

(65) Prior Publication Data

US 2009/0201993 A1    Aug. 13, 2009

Related U.S. Application Data

(60) Provisional application No. 61/028,354, filed on Feb. 13, 2008.

(51) Int. Cl.
*H04N 7/12* (2006.01)
*H04N 19/433* (2014.01)
*H04N 19/53* (2014.01)

(52) U.S. Cl.
CPC ............. *H04N 19/433* (2014.11); *H04N 19/53* (2014.11)

(58) Field of Classification Search
CPC ..................................................... H04N 19/433
USPC .................................................... 375/240.16
See application file for complete search history.

(56) References Cited

U.S. PATENT DOCUMENTS

| | | | |
|---|---|---|---|
| 5,805,804 A * | 9/1998 | Laursen et al. | 709/223 |
| 7,038,737 B1 * | 5/2006 | Kohashi et al. | 348/718 |
| 2004/0264565 A1 * | 12/2004 | MacInnis | 375/240.01 |
| 2005/0078749 A1 * | 4/2005 | Ju | 375/240.12 |
| 2005/0254581 A1 * | 11/2005 | Iguchi et al. | 375/240.12 |
| 2006/0268012 A1 * | 11/2006 | MacInnis et al. | 345/629 |
| 2008/0013628 A1 * | 1/2008 | Lu et al. | 375/240.12 |
| 2008/0285652 A1 * | 11/2008 | Oxman et al. | 375/240.16 |

* cited by examiner

*Primary Examiner* — Richard Torrente
(74) *Attorney, Agent, or Firm* — Foley & Lardner LLP

(57) ABSTRACT

Presented herein are system(s), method(s), and apparatus for scalable memory access. One example, among others, is a system for requesting services. The system includes one or more requesting node(s) for performing a function with real-time requirements, such as making requests. The one or more requesting node(s) indicates whether each of said requests is required or optional.

34 Claims, 5 Drawing Sheets

SYSTEM, METHOD, AND APPARATUS FOR SCALABLE MEMORY ACCESS

RELATED APPLICATIONS

This application claims priority to "System, Method, and Apparatus for Scalable Memory Access, Provisional Application for U.S. Patent Ser. No. 61/028,354, filed Feb. 13, 2008, by MacInnis, which is incorporated herein by reference in its entirety. This application is also related to "Multiple Miss Cache" U.S. application Ser. No. 12/334,710, filed Dec. 15, 2008 and "Video Cache", U.S. patent application Ser. No. 10/850,911, filed May 21, 2004 by MacInnis each of which are incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Compression is often used to reduce the amount of bandwidth used to transfer video data, and reduce the amount of memory that is used to store the video data. However, compressing video data can be computationally intense and can use a large amount of memory bandwidth.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in system(s) and method(s) for improved encoding of compressed video data, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF PREFERRED EMBODIMENTS

Figure 1:
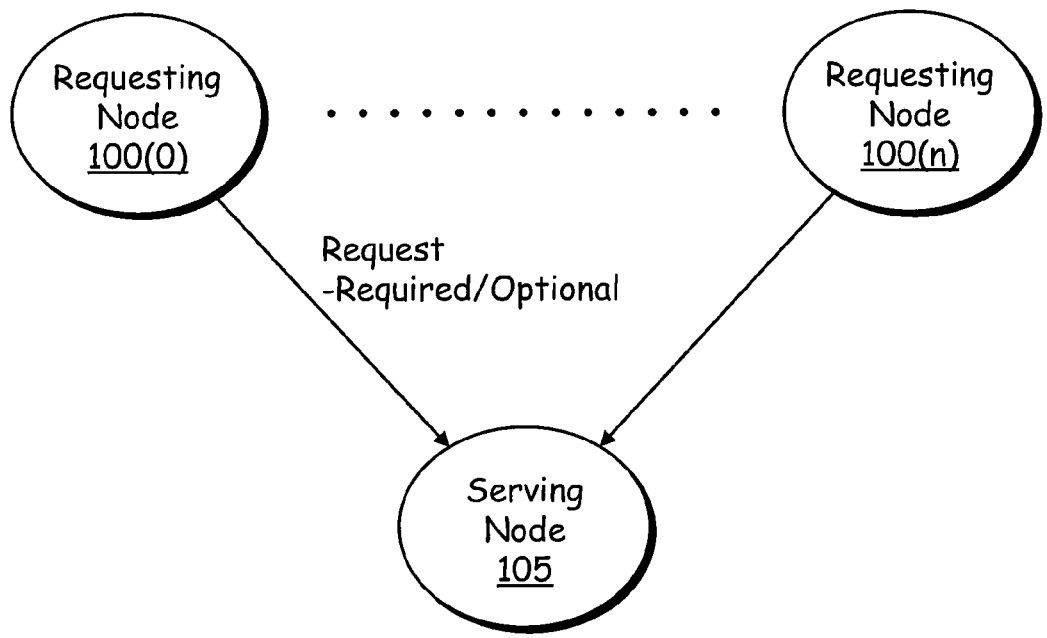
FIG. 1 is a block diagram of an exemplary system of requesting node(s) requesting services from a serving node in accordance with an embodiment of the present invention.

Referring now to FIG. 1, there is illustrated a block diagram describing an exemplary system of requesting node(s) 100(0 ... n) requesting services from a serving node 105 in accordance with an embodiment of the present invention. The requesting node(s) 100(0 ... n) can be discrete entities that are in contention with one or more other entities for a particular resource. The serving node 105 is an entity that provides a service or resource that is in contention.

In certain embodiments of the present invention, the requesting node(s) 100 can comprise a client computer terminal while the serving node 105 can comprise a server. In other embodiments, the requesting node(s) 100 can comprise multiple threads that are concurrently executed and make competing requests for certain operations by a hardware device. In the foregoing example, the serving node 105 can be the hardware device. In other embodiments, the requesting node(s) 100 can be modules in an integrated circuit that are in contention for a particular resource, such as an arithmetic logic unit, or memory bandwidth.

The requesting node(s) 100 can perform certain functions that may have real-time requirements. Accordingly, there are corresponding real-time requirements that are associated with the servicing of at least some of the requests by the requesting node(s) 100. Additionally, the servicing of the requests also affects the performance of the requesting node(s) 100.

Accordingly, the requesting node(s) 100 make requests to the serving node 105 indicating whether each request is required or optional. According to certain embodiments of the present invention, the requesting node(s) 100 themselves determine whether each request is required or optional for their real-time operation requirements. In video compression, a required request, for example, could be for a patch of reference video samples (or pixels) that the encoder needs in order to perform at least a minimal encoding function, while an optional request could be, for example, for a patch of reference video samples (or pixels) that may enable the encoder to perform a more effective encoding function, such as producing higher quality video for a given bit rate.

In certain embodiments of the present invention, requests that are indicated as required are requests that need servicing in order for the requesting node 100 to meet the minimum requirements of its real-time operation, while requests that are indicated as optional are requests that if/when serviced would improve the quality or the performance of the real-time operation, or improve the speed or efficiency of the real-time operation beyond the minimum requirements.

The serving node 105 receives the requests and based on the volume of requests, the time and resources needed to accommodate the requests, and the available or estimated available time and resources, the serving node 105 determines whether to accommodate some or any of the requests that are indicated as optional. Irrespective of the volume of requests and the time and resources needed to accommodate the requests, and time and resources available, the serving node 105 accommodates the requests that are indicated as required and according to the real-time requirements of the requesting node(s) 100.

In certain embodiments of the present invention, the serving node 105 can include a real-time scheduling system that determines the bandwidth needed to accommodate the required requests. The real-time scheduling system then determines the amount of excess bandwidth available over the amount needed to accommodate the required requests. Based on this and the amount of bandwidth required to accommodate the optional requests, the real-time scheduling system determines whether and the extent to which optional requests are accommodated.

Figure 2:
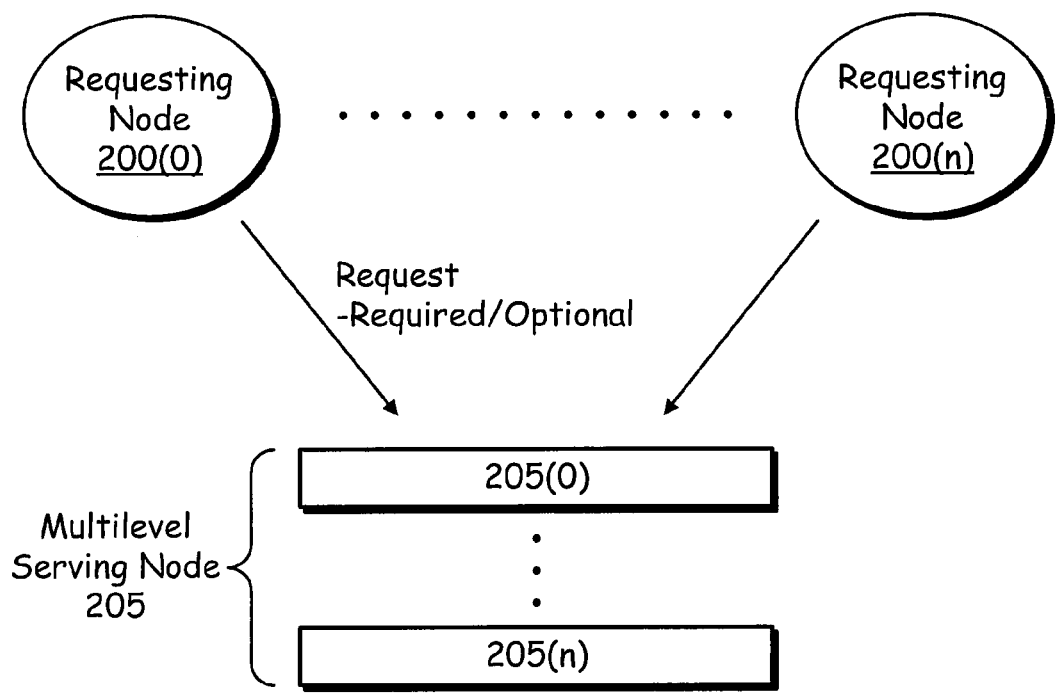
FIG. 2 is a block diagram of an exemplary system of requesting node(s) requesting services from multilevel serving node in accordance with an embodiment of the present invention.

In certain embodiments of the present invention, the system can comprise a multilevel serving node. Referring now to FIG. 2, there is illustrated a block diagram describing an exemplary system of requesting node(s) 200(0 . . . n) requesting services from a multilevel serving node 205. The requesting node(s) 200(0 . . . n) can be discrete entities that are in contention with one or more other entities for a particular resource. The serving node 205 is an entity that provides a service or resource that is in contention.

The multilevel serving node 205 can comprise a hierarchy of serving nodes 205(0 . . . n). In certain embodiments of the present invention, the higher level of the hierarchy, e.g., serving node 205(0), is generally faster, but is not necessarily equipped to perform particular requests. The lower levels of the hierarchy are generally slower, but are more likely to be equipped to accommodate particular requests. For example, a higher level of the hierarchy 205(0) can be optimized to perform more common requests at a faster speed. However, due to cost considerations, the higher level of the hierarchy of the multilevel serving node 205 may not be capable of accommodating other requests.

Each level of the hierarchy of the multilevel server 205 can make a determination whether the level can perform each particular request received by the requesting node(s) 200. If a level cannot accommodate each particular request received by the requesting node 200, the level sends the request to the next lower level in the hierarchy. In certain embodiments of the present invention, the lowest level of the hierarchy 205($n$) is capable of performing all of the requests, but is the slowest of the levels.

The requesting node(s) 200 make requests to the serving node 205 indicating whether each request is required or optional. According to certain embodiments of the present invention, the requesting node(s) 200 themselves determine whether each request is required or optional for their real-time operation requirements.

The multilevel serving node 205 receives the requests. The lowest level of the multilevel serving node 205($n$), determines, based on the volume of requests that are received by the lowest level, the time and resources needed to accommodate the requests, and the available or estimated available time and resources, whether to accommodate all, some, or any of the requests that are indicated as optional. Irrespective of the volume of requests and the time and resources needed to accommodate the requests, the lowest level 205($n$) accommodates the requests that are indicated as required and according to the real-time requirements of the requesting node(s) 200.

In certain embodiments of the present invention, the lowest level 205($n$) can include a real-time scheduling system that determines the bandwidth needed to accommodate the required requests. The real-time scheduling system then determines the amount of excess bandwidth available over the amount needed to accommodate the required requests. Based on this and the amount of bandwidth required to accommodate the optional requests, the real-time scheduling system determines whether and the extent to which optional requests are accommodated.

Figure 3:
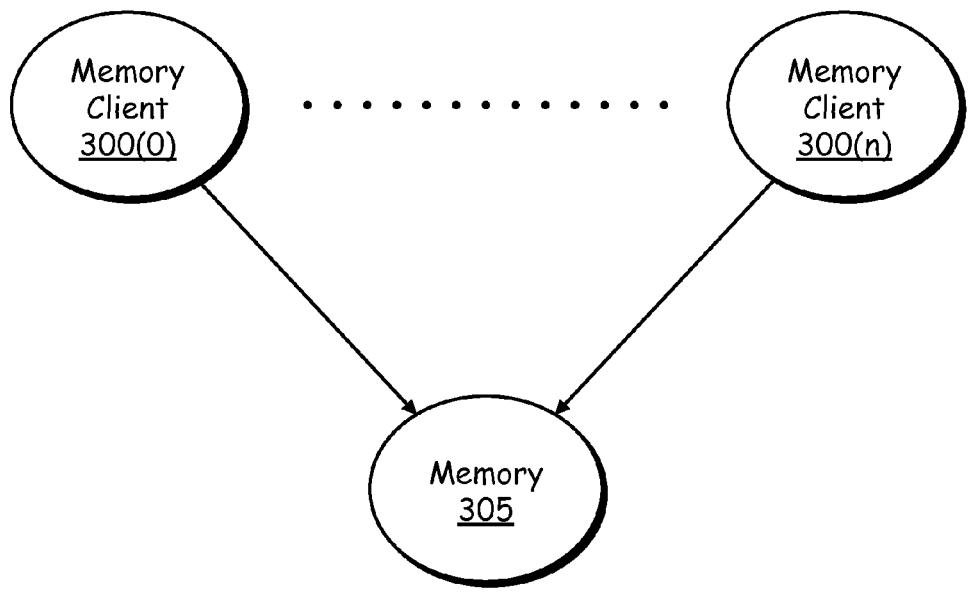
FIG. 3 is a block diagram of an exemplary system of memory clients requesting access to data in a memory in accordance with an embodiment of the present invention.

Referring now to FIG. 3, there is illustrated a block diagram describing an exemplary system of memory clients 300(0 . . . n) requesting access data from the memory 305. The memory 305 can comprise, for example, RAM, DRAM, SRAM or SDRAM.

In certain embodiments of the present invention, the memory clients 300 can comprise multiple threads that are concurrently executed and which make competing requests to access data from the memory. In other embodiments, the memory clients 300 can be modules in an integrated circuit that request to access data from the memory 305.

The memory clients 300 can perform certain functions that may have real-time requirements. Accordingly, there are corresponding real-time requirements that are associated with the servicing of at least some of the requests for data by the memory clients 300. Additionally, the servicing of the requests also affects the performance of the memory clients 300.

Accordingly, the memory clients 300 make requests to access data to the memory 305, indicating whether the request to access data is required or optional. According to certain embodiments of the present invention, the memory clients 300 themselves determine whether the request to access data is required or optional for their real-time operation requirements.

The memory 305 receives the requests to access the data and based on the volume of requests, the time and resources needed to accommodate the requests, and the available or estimated available time and resources, the memory 305 determines whether to accommodate some or any of the requests to access data that are indicated as optional. Irrespective of the volume of requests to access data and the time and resources needed to accommodate the requests, the memory 305 accommodates the requests to access data that are indicated as required and according to the real-time requirements of the memory clients 300.

In certain embodiments of the present invention, the memory 305 can include a real-time scheduling system that determines the bandwidth needed to accommodate the required requests to access the data. The real-time scheduling system then determines or estimates the amount of excess bandwidth available over the amount needed to accommodate the required requests to access the data. Based on this and the amount of bandwidth required to accommodate the optional requests to access the data, and on resource availability, the real-time scheduling system determines whether and the extent to which optional requests are accommodated.

Resource availability can be measured in a variety of different ways, including, but not limited to, estimated resource availability, memory cycle availability, cycle availability, queue depth, and/or prior latency.

Figure 4:
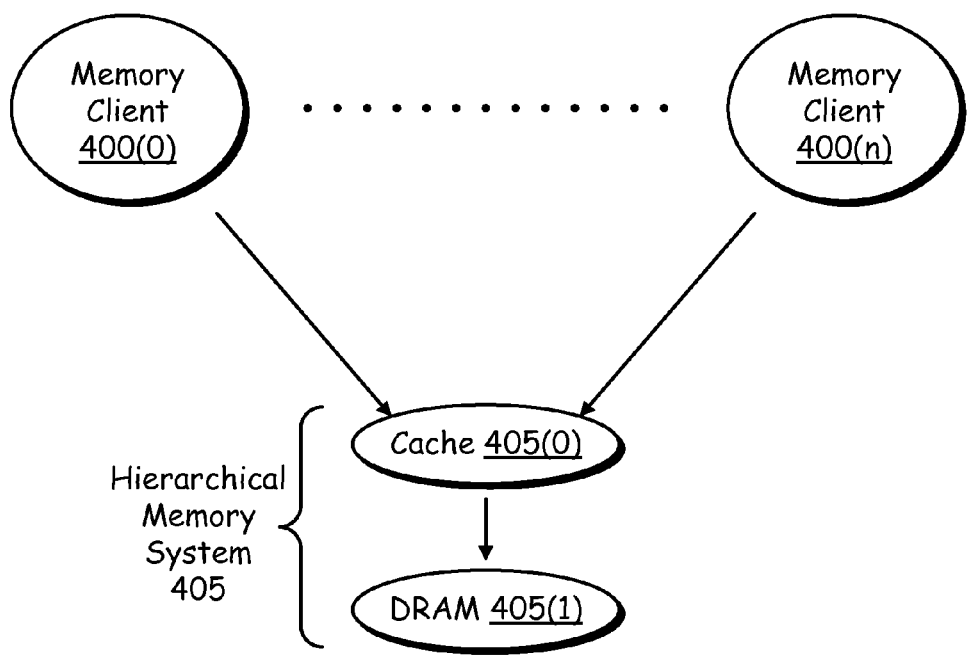
FIG. 4 is a block diagram of an exemplary system of memory clients requesting access to data in a hierarchical memory system in accordance with an embodiment of the present invention.

In certain embodiments of the present invention, the memory system can comprise a hierarchical memory system. Referring now to FIG. 4, there is illustrated a block diagram describing an exemplary system of memory clients 400(0 . . . n) requesting services from a hierarchical memory system 405.

The hierarchical memory system 405 can comprise a cache 405(0) and DRAM 405(1). The cache 405(0) is a faster but smaller memory that stores data from only the most recently accessed memory addresses of the DRAM 405(1). If a cache miss occurs, the request to access data goes to the DRAM 405(1).

The memory clients 400 make requests to access data to the hierarchical memory system 405 indicating whether the requests to access data are required or optional. According to certain embodiments of the present invention, the memory clients 400 themselves determine whether each request is required or optional for their real-time operation requirements.

The hierarchical memory system 405 receives the requests. The DRAM 405(1) determines, based on the volume of requests that are received, the time and resources needed to accommodate the requests, and the available or estimated available time and resources, whether to accommodate all, some, or any of the requests that are indicated as optional. Irrespective of the volume of requests and the time and resources needed to accommodate the requests, the DRAM 405(1) accommodates the requests that are indicated as required and according to the real-time requirements of the memory clients 400.

In certain embodiments of the present invention, the DRAM 405 can include a real-time scheduling system that determines the bandwidth needed to accommodate the required requests. The real-time scheduling system then determines or estimates the amount of excess bandwidth available over the amount needed to accommodate the required requests. Based on this and the amount of bandwidth required to accommodate the optional requests, and on resource availability, the real-time scheduling system determines whether and the extent to which optional requests are accommodated.

Certain embodiments of the present invention can include dynamically determining a subset of reference data to be fetched from memory and delivered to a motion estimation (ME) or motion compensation (MC) function in video compression and/or decompression. Determining a subset of reference data to be fetched from memory and delivered to a motion estimation (ME) or motion compensation (MC) function simultaneously bounds the real-time scheduling (RTS) requirements of the ME & MC functions while maximizing video coding quality.

In certain embodiments, reference patches are requested in a prioritized list, where one or more of the top priority patches may be indicated as required, with the remainder being indicated as optional. Delivery of required patches should be assured by real-time scheduling design. Optional patches may be requested from memory and delivered to the requesting function according to current memory system performance. The ME and MC functions may function correctly using only the required patches, and they may utilize all of the required and optional patches that are returned for improved coding.

The priority list of patches may be created statically or dynamically. For example, in certain embodiments of the present invention, a static list may be chosen based on the operating mode and throughput requirements of the encoder and on the overall memory system loading. In other embodiments of the present invention, a dynamic list may be chosen based on parameters or data associated with the video being encoded, such as coarse motion vector (CMV) values, values resulting from processing other macroblocks, or other information.

A motion compensation (MC) function may utilize the present method when the MC is requested to perform MC operations on different reference data. For example, the MC may be involved in deciding between normal and direct mode, where normal mode may be the default and direct mode may be an option that may be advantageous. In this example, the normal mode data may be required and the direct mode data may be optional. Similarly for decisions between field and frame based coding modes, one of which may be designated as required and another as optional.

The present method may be combined with a prediction cache (P$). For example, requests for patches of reference samples that result in P$ hits may be provided by the P$ without requiring accesses to the bulk memory. In many cases, requested patches that are close to or overlapping previously requested patches may result in a high P$ hit rate, while widely separated patches may result in a low P$ hit rate. With lower P$ hit rates, more data is requested from bulk memory, and if the memory system is not able to provide all of the optional requested patches on time then some of the optional patches may not be returned.

Detection of the current DRAM system performance may be performed by requesting some optional reference data and estimating or measuring the latency experienced in returning the data from DRAM. Requests for optional data may be queued, and the amount of time that optional data requests remain in the queue may be measured or estimated. Optional data returned by a pre-determined deadline may be provided to the requesting function (e.g. ME or MC), and optional data returned later may be discarded. Requests for optional data that have not yet been queued or not yet passed to the memory controller before a second pre-determined deadline may be discarded. The second deadline may be the same as the first deadline, or it may be different. Requests for required data may be processed separately. For example, required data requests may be processed via a separate queue, and they may be processed by the memory controller at a higher priority than the optional requests.

Figure 5:
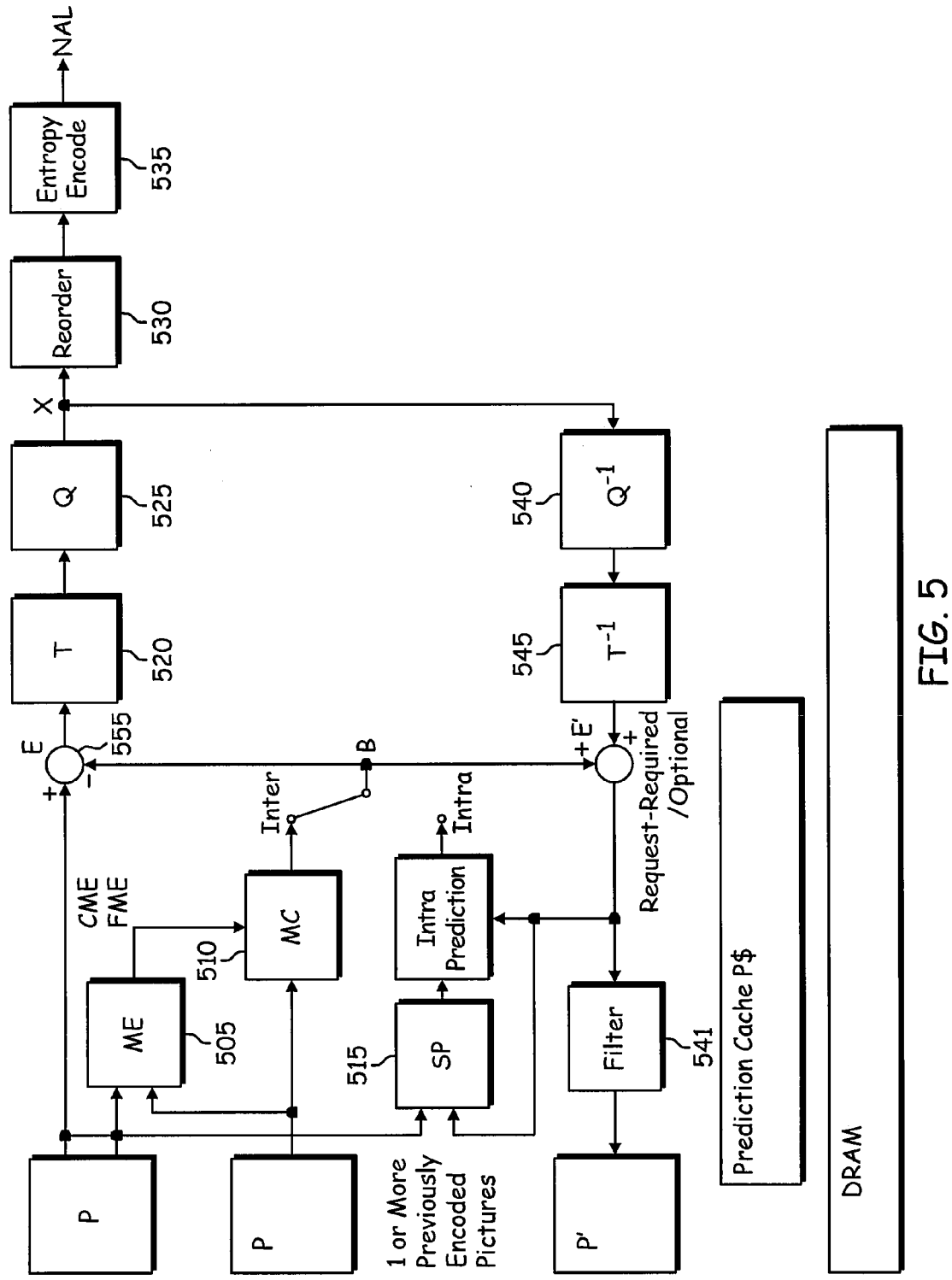
FIG. 5 is a block diagram of an exemplary video encoder in accordance with an embodiment of the present invention.

Referring now to FIG. 5, there is illustrated a block diagram describing an exemplary video encoder in accordance with an embodiment of the present invention. The video encoder encodes video data comprising a set of pictures $P_0 \ldots P_n$. The video encoder comprises motion estimator(s) (ME) 505, motion compensator(s) (MC) 510, spatial predictor(s) 515, transformation engine 520, quantizer 525, reordering scanner 530, entropy encoder(s) 535, inverse quantizer 540 and inverse transformation engine 545. The foregoing can comprise hardware accelerator units under the control of a CPU. The ME 505 comprises coarse motion estimator(s) (CME) and fine motion estimator(s) (FME).

When an input picture $P_n$ is presented for encoding, the video encoder processes the picture $P_n$ in units of macroblocks. The video encoder can encode each macroblock using either spatial (intra) or temporal (inter) prediction. In each case, the video encoder forms a prediction block B. In spatial prediction mode, the spatial predictor(s) 515 form the prediction macroblock B from samples of the current picture $P_n$ that were previously encoded. In temporal prediction mode, the motion estimator(s) 505 and motion compensator(s) 510 form a prediction macroblock B from one or more reference pictures. Additionally, the motion estimator(s) 505 and motion compensator(s) 510 provide motion vectors identifying the prediction block or blocks.

A subtractor 555 subtracts the prediction macroblock B from the macroblock in picture $P_n$, resulting in a prediction error E. Transformation engine 520 and quantizer 525 block transform and quantize the prediction error E, resulting in a set of quantized transform coefficients X. The reordering scanner 530 reorders the quantized transform coefficients X. The entropy encoder(s) 535 entropy encode the coefficients.

The video encoder also decodes the quantized transform coefficients X, via inverse quantizer 540 and inverse transformation engine 545, in order to reconstruct the picture $P_n$ for encoding of later macroblocks, either within picture $P_n$ or other pictures. The filter 541 may be applied to reconstructed pictures before storing said pictures to DRAM for use in predicting other pictures.

Figure 6:
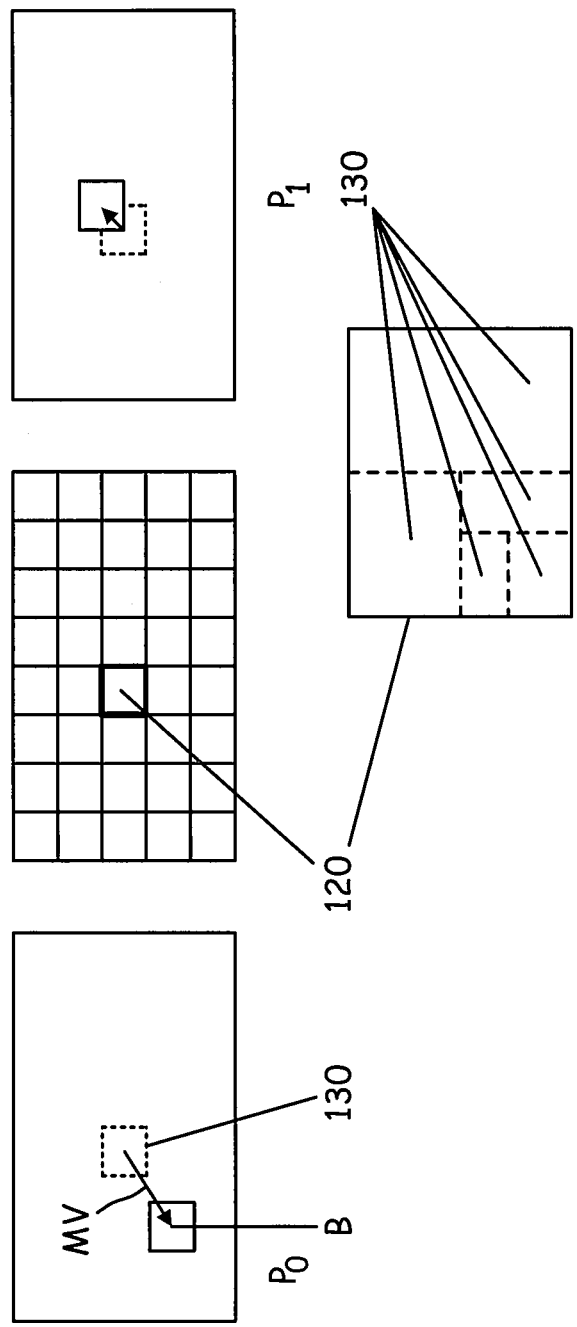
FIG. 6 is a block diagram describing motion estimation in accordance with an embodiment of the present invention.

The video encoder will now be further described in connection with FIG. 6, which describes motion estimation in accordance with an embodiment of the present invention. A picture is divided into macroblocks 120. The macroblocks 120 can be divided into 16×8, 8×16, 8×8, 4×8, 8×4, and 4×4 partitions 130. Each partition 130 of a macroblock 120, is compared to the pixels of other pictures for a similar block of pixels B. The similar block of pixels B can either be derived directly from or be generated by interpolation from a block of reference pixels from another picture. In the H.264 standard, the prediction pixels can be generated by interpolation with ¼ pixel resolution from reference pixels. A macroblock 120 is encoded as the combination of the coded prediction errors E, motion vectors, reference picture identification, and partitions 130. The difference between the partition 130 and the prediction pixels B is known as the prediction error E. The prediction error E is calculated and encoded, along with an indicator of the reference pixels and prediction pixels B. Motion vectors MV indicate the relationship between reference pixels and prediction pixels B. Motion vectors MV describe the spatial displacement between the partition 130 and the reference pixels and provide an indicator of the manner of interpolating the prediction pixels B.

The partition can also be predicted from blocks of pixels B in more than one picture. In bi-predicted coding, the partition 130 can be predicted from blocks of pixels from two reference pictures, P0 and P1. With motion estimation, the macroblock 120 is represented by a prediction error E. The prediction error E for a macroblock is also a two-dimensional grid of pixel values. A transformation can be applied to the prediction error E, thereby representing the prediction error E by transform coefficients.

In an exemplary encoder the ME 505 performs motion estimation in two passes, coarse motion estimation by the CME and fine motion estimation by the FME. In coarse motion estimation, the macroblocks are compared to original pictures, in contrast to reconstructed pictures, with whole pixel resolution or the resolution of multiple whole pixels, in contrast with fractional pixel resolution. The foregoing results in coarse motion vector(s) (CMVs) for each macroblock. The FME uses the CMVs to determine reference blocks to be fetched from a hierarchical memory system comprising a prediction cache (P$) and DRAM. In certain embodiments of the present invention, the prediction cache (P$) can comprise a cache described in U.S. patent application Ser. Nos. 10/850,911 or 12/334,710, each of which are incorporated by reference in their entirety.

The FME uses up to a predetermined number of coarse motion vectors (CMVs) per reference picture to request reference patches for refining the MVs and partitions of the current MB (CMB). The values of these CMVs may be similar to one another, some may be identical, or they may differ widely. Of the predetermined number of CMVS, all but one are produced by the CME and the remaining CMV is the zero (or null) MV. Of the predetermined number of CMVS, at least one is the CMV of the current MB, and the remaining CMVs are from the neighboring MBs. If all of the CMVs are significantly different from one another, each could result in the FME requesting a different patch (or tile) of pixels from memory. With chroma being utilized in the FME, each CMV can result in both a luma patch request and a chroma patch request.

In the case of a worst case set of CMVs (i.e. no savings due to adjacent patches), worst case alignment of all patches to DRAM words, a P$ hit rate of zero, inclusion of all patches resulting from all CMVs, and inclusion of chroma for all patches, this can result in accessing a large number of words from the DRAM resulting in a significant load on the DRAM system that may not be practical in some systems.

In certain embodiments of the present invention, real-time scheduling with high FME performance is achieved if the FME abandons processing of some requested reference patches for a given MB when necessary in order to limit the DRAM RTS requirements. The decision to abandon processing of certain reference patches within a MB can be made by a prediction cache P$, based on the ability of the P$ and DRAM system to return requested data within a defined time limit.

In one embodiment, as the FME begins processing the CMVs for a MB, it requests patches of pixels (luma and chroma components separately) from the prediction cache P$. The FME requests patches of pixels in priority order, highest priority first. The use of priority order enables the prediction cache P$ and FME to ensure that higher priority patches are serviced first, and if a patch is abandoned or aborted, all lower priority patches within the same MB are also automatically abandoned.

The prediction cache P$ converts each patch request into a set of DRAM word requests, and passes each word request though the prediction cache P$ to test for hit or miss. Hits are returned from the prediction cache P$ within a few clock cycles. If all DRAM words required for a patch result in P$ hits, the patch can be returned to the FME without making any DRAM requests. If one or more words result in prediction cache P$ misses, the prediction cache P$ needs to request those words from DRAM in order to return the requested patch to the FME.

Two mechanisms limit the amount of DRAM request activity per MB to a supportable level and coordinate the FME's processing activity with the P$ hit rate and DRAM request activity. The first mechanism causes the FME to abandon processing of lower priority patches for the current MB. The second mechanism causes the prediction cache P$ to stop requesting data from DRAM when it is apparent the DRAM system is fully loaded.

In certain embodiments the prediction cache P$ automatically limits or allocates the time spent fetching patches of pixels for the FME by returning to the FME only those patches of pixels that it can return within a specified deadline. In certain embodiments of the present invention, this deadline can be set equal to the MB period starting from the first patch request for a MB.

If all patches for a MB can be provided to the FME by the deadline, then all patches are successfully returned; these are referred to as "successful" patches. The FME processes all successful patches normally. A patch is successful if all words of data required to complete it are either hits in the P$ or returned from DRAM (i.e. after a P$ miss) within the allotted time.

If the deadline passes before all words comprising a patch can be returned to the FME, the prediction cache P$ returns a code to the FME that means "abandon patch". This event would occur if the combination of the number of words missed in the prediction cache P$ and the DRAM latency for the words missed in the prediction cache P$ resulted in latency in excess of the RTS limits for the specific system. The DRAM latency experienced by the prediction cache P$ when accessing DRAM is normally variable and dependant on instantaneous variations in demands on the DRAM system by other DRAM clients. Note that even in a system with a heavily loaded RTS schedule, the typical DRAM cycle load may be significantly lighter than the instantaneous worst case. Therefore it is reasonable to expect that the DRAM system can support heavy loads from the FME much of the time, without being able to guarantee timely service to heavy loads from the FME at all times.

If the FME receives an abandonment indication from the prediction cache P$ while fetching optional patches of pixels requested for processing the current MB, the FME excludes the abandoned patches from its operations for the current MB. Note that since luma and chroma are requested separately in certain embodiments and the luma and chroma components of a given reference patch may have different priorities, it is possible for the FME to process a larger set of CMVs (i.e. patches) using luma alone than the set it can process using both luma and chroma, assuming luma patches are given equal or higher priority than chroma patches.

In certain embodiments of the present invention, the prediction cache P$ stops requesting data from the DRAM for a given MB whenever the prediction cache P$ determines that the instantaneous DRAM schedule is excessively loaded, after servicing the required requests. This is important so that words for patches that are going to be abandoned for the current MB are not needlessly requested from DRAM, potentially increasing the DRAM load for the next MB. The prediction cache P$ stops requesting optional words from the DRAM whenever the first of these three events occurs:

(1) The prediction cache P$ decides to abandon processing of patches for the current MB, i.e. the memory latency the prediction cache P$ has experienced for the current MB has already reached a limit,
(2) The number of DRAM words requested from DRAM by the prediction cache P$ reaches a preset limit, or
(3) the prediction cache P$ determines that the DRAM access bus request queue is loaded beyond a threshold.

The mechanism of determining that the access bus request queue is overloaded, referred to as "access bus overload", measures the depth of DRAM word requests in a queue that feeds the access bus. The physical queue may be a portion of the access bus input queue, exactly the access bus input queue, a queue in the prediction cache P$, or a combination of the access bus input queue and a queue in the prediction cache P$. The maximum depth of the request queue is set such that it is not exceeded when the DRAM system is able to service access bus requests quickly, while it is exceeded when the prediction cache P$'s DRAM word requests exceed the current scheduling capacity of the DRAM system.

To facilitate dynamic operation of both a guaranteed level of DRAM performance for the FME, and also best effort additional performance for the FME while also servicing other clients with real-time requirements, the prediction cache P$'s DRAM requests on behalf of the FME can be in two distinct priorities. A very high priority (according to RTS) is used for the performance required by and guaranteed for the FME, and a significantly lower priority can be used for optional data. Round robin arbitration can be used for all optional or additional DRAM requests on behalf of the FME.

The embodiments described herein may be implemented as a board level product, as a single chip, application specific integrated circuit (ASIC), or with varying levels of the system integrated with other portions of the system as separate components.

The degree of integration may primarily be determined by speed and cost considerations. Because of the sophisticated nature of modern processors, it is possible to utilize a commercially available processor, which may be implemented external to an ASIC implementation.

Figure 7:
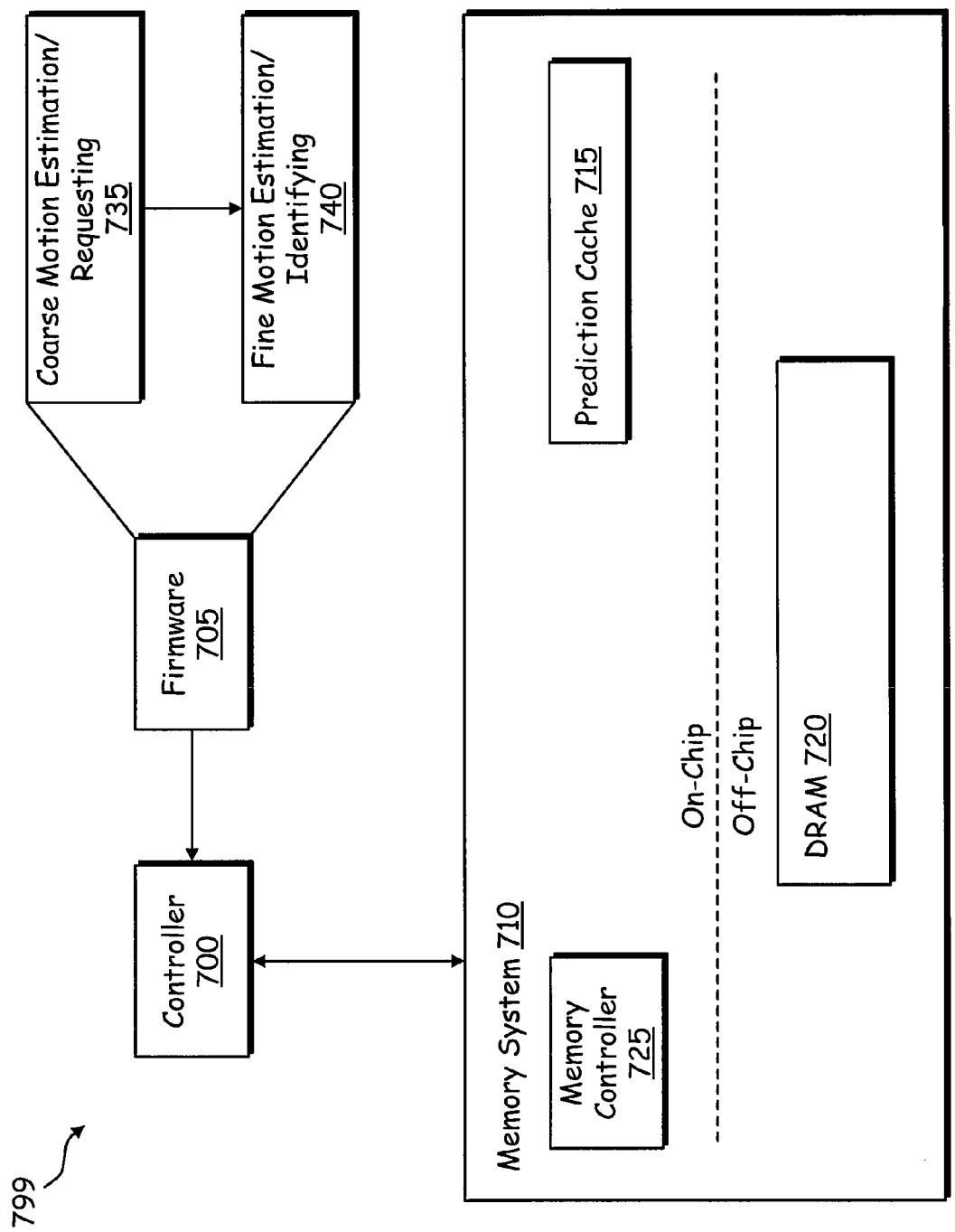
FIG. 7 is a block diagram describing an exemplary integrated circuit in accordance with an embodiment of the present invention.

For example, referring to FIG. 7, there is illustrated a block diagram describing an exemplary circuit for requesting services. The circuit comprises a controller 700 for performing a function in real-time, and firmware 705 for storing instructions that are executed by the controller. In certain embodiments of the present invention, the controller 700 can comprise a conventional processor, an embedded processor, or an accelerator. Execution of the instructions by the controller 700 causes the controller 700 to make requests to a serving entity and indicate whether the requests are optional or required.

In certain embodiments of the present invention, the serving entity can comprise a memory system 710. The memory system 710 can comprise a memory controller 725. The memory system 710 selectively determines, based at least in part on resource availability, whether to service each of the requests that are indicated as optional by the controller 700.

In certain embodiments of the present invention, the memory system 710 can further comprise a prediction cache. The memory system selectively determines, based on resource availability, whether to service each of the requests that result in misses to the cache 715 that are indicated as optional.

In certain embodiments of the present invention, the circuit 799 can comprise a video encoder, wherein the controller 700 performs motion estimation for a block of pixels. The memory system 710 stores reference pictures. The firmware 705 includes a first set of instructions 735 for coarse motion estimation and indicating blocks from the reference pictures. The firmware 705 includes a second set of instructions 740 for fine motion estimation and determining the reference pixels that are required or optional.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for requesting services, said system comprising:
   a requesting node configured to perform a function with requirements, the requesting node configured to:
      transmit a plurality of requests associated with the requirements of the function, the plurality of requests including one or more required requests for one or more required data items required to meet the requirements of the function and one or more optional requests for one or more optional data items optional to meet the requirements of the function, wherein each of the requests includes an indication of whether the request is required or optional to meet the requirements;
      receive all of the required data items in response to the required requests;
      receive optional data items in response to at least one of the optional requests that have been selectively serviced based at least in part on a volume of the plurality of requests and at least one of an actual time and resource availability to accommodate the requests or an estimated time and resource availability to accommodate the requests, such that one or more of the optional requests are not serviced when the at least one of the actual time and resource availability or the estimated time and resource availability indicates insufficient time or resources are available to service all of the optional requests before a deadline for servicing the requests; and perform the function using all of the required data items and only those optional data items that have been received at a time to perform the function.

2. The system of claim 1, wherein the requesting node further comprises a client computer.

3. The system of claim 1, wherein the requesting node further comprises one or more memory clients configured to request data from at least one memory device.

4. The system of claim 3, further comprising:
a random access memory for servicing the requests that are indicated as required according to the real-time requirements of the memory clients, and selectively servicing the requests that are indicated as optional based at least in part on resource availability.

5. The system of claim 4, further comprising:
a real-time scheduling system for selectively determining, based at least in part on resource availability, whether to service each of the requests that are indicated as optional.

6. The system of claim 1, further comprising:
a cache configured to receive the plurality of requests and for servicing each request of the plurality of requests that results in a cache hit; and
random access memory configured to:
receive each request of the plurality of requests not serviced by the cache;
service each request not serviced by the cache and indicated as required; and
service one or more requests not serviced by the cache and indicated as optional based at least in part on a volume of the plurality of requests and at least one of an actual time and resource availability to accommodate the requests or an estimated time and resource availability to accommodate the requests, at least a portion of the optional requests discarded when the at least one of the actual time and resource availability or the estimated time and resource availability indicates insufficient time or resources are available to service all of the optional requests before a deadline for servicing the requests.

7. The system of claim 6, further comprising:
a scheduling system configured to selectively determine, based at least in part on the time and resource availability, whether to service each real-time request not serviced by the cache and indicated as optional, the scheduling system configured to select the at least a portion of the optional requests to be discarded when insufficient time or resources are available to service all of the optional requests before a deadline for servicing the requests.

8. The system of claim 1, the one or more optional data items comprising data that is usable to improve at least one of a quality or a performance of the function, but without which the requirements of the function can be fulfilled.

9. The system of claim 1, wherein requirements of the function are real-time requirements.

10. The system of claim 1, the requesting node configured to:
use a first set of one or more of the optional data items received by a deadline to perform the function; and
perform the function without using a second set of one or more of the optional data items not received by the deadline.

11. The system of claim 1, wherein one or more of the optional requests are not serviced when the at least one of the actual time and resource availability or the estimated time and resource availability indicates insufficient time or resources are available to service all of the optional requests before a deadline for servicing the requests, the requesting node configured to wait to receive all of the required data items before performing the function and to perform the function regardless of whether all of the optional data items are received.

12. A video encoder for encoding video data, said video encoder comprising:
a memory system for storing reference pictures; and
a motion estimator for motion estimating a current macroblock and for generating one or more requests for a plurality of portions of the reference pictures from the memory system, the plurality of portions of the reference pictures requested from the memory system including one or more required portions required for the motion estimating of the current macroblock and one or more optional portions for the motion estimating of the current macroblock, wherein each request for a portion includes an indication of whether the portion is required or optional for the motion estimating of the current macroblock;
the memory system configured to provide each required portion; and
at least one of the memory system or the motion estimator configured to selectively determine whether to provide one or more of the portions indicated as optional based at least in part on a volume of the one or more requests and at least one of an actual time and resource availability to accommodate the requests or an estimated time and resource availability to accommodate the requests, the at least one of the memory system or the motion estimator configured to determine not to provide at least part of the one or more of the portions indicated as optional when the at least one of the actual time and resource availability or the estimated time and resource availability indicates insufficient time or resources are available to provide all of the optional portions before a deadline for servicing the requests.

13. The video encoder of claim 12, wherein the memory provides each of the requested one or more portions that are indicated as required and selectively provides each of the requested one or more of portions that are indicated as optional.

14. The system of claim 13, further comprising:
a real-time scheduling system for selectively determining, based at least in part on resource availability, whether to service each of the requests for the plurality of portions that are indicated as optional.

15. The video encoder of claim 12, wherein the memory system further comprises:
a prediction cache configured to store certain portions of the reference pictures, to receive the requests for the plurality of portions, and to provide each requested portion of the plurality of portions that is among the certain portions stored in the prediction cache; and
random access memory configured to:
receive each request for a portion of the plurality of portions not among the certain portions;
service each request for a portion not among the certain portions and indicated as required for the motion estimating; and service, based on a volume of the one or more requests and at least one of the actual time and resource availability to accommodate the requests or the estimated time and resource availability to accommodate the requests, one or more requests for portions not among the certain portions and indicated as optional for the motion estimating, at least a portion of the requests for one or more of the optional portions discarded when the at least one of the actual time and resource availability or the estimated time and resource availability indicates insufficient time or resources are available to provide all of the optional portions before a deadline for servicing the requests.

16. The video encoder of claim 15, the at least one of the memory system or the motion estimator comprising:
   a scheduling system configured to selectively determine, based at least in part on a volume of the one or more requests and at least one of the actual time and resource availability to accommodate the requests or the estimated time and resource availability to accommodate the requests, whether to service each of the requests for the portion not among the certain portions and indicated as optional, the scheduling system configured to select the at least a portion of the requests for the optional portions to be discarded when the at least one of the actual time and resource availability or the estimated time and resource availability indicates insufficient time or resources are available to provide all of the optional portions before a deadline for servicing the requests.

17. The video encoder of claim 12, wherein the motion estimator further comprises:
   a first circuit for identifying the plurality of portions of the reference pictures; and
   a second circuit for determining whether each of the plurality of portions of the reference pictures is required or optional for the motion estimating of the current macroblock.

18. The video encoder of claim 17, wherein the first circuit identifies one or more portions for the current macroblock, and one or more portions for macroblocks neighboring the current macroblock using at least one motion vector, and wherein the plurality of portions requested by the motion estimator comprises the one or more portions for the current macroblock and the one or more portions for the neighboring macroblocks.

19. A system for encoding video data, said system comprising:
   an integrated circuit for encoding video data, said integrated circuit comprising:
      a motion estimator for motion estimating a current macroblock, the motion estimator configured to:
         generate one or more requests for a plurality of portions of reference pictures from a memory system, the plurality of portions of the reference pictures requested from the memory system including one or more required portions required for the motion estimating of the current macroblock and one or more optional portions for the motion estimating of the current macroblock, wherein each request for a portion includes an indication of whether the portion is required or optional for the motion estimating of the current macroblock;
         receive all of the required portions;
         receive optional portions that have been selectively provided based at least in part on a volume of the one or more requests and at least one of an actual time and resource availability to accommodate the requests or an estimated time and resource availability to accommodate the requests, such that at least one of the optional portions is not provided when the at least one of the actual time and resource availability or the estimated time and resource availability indicates insufficient time or resources are available to provide all of the optional portions before a deadline for servicing the requests; and
         perform the motion estimating using all of the required portions and only those optional portions that have been received at a time to perform the motion estimation.

20. The system of claim 19, wherein the motion estimator further comprises:
   a coarse motion estimator for identifying the plurality of portions of the reference pictures; and
   a fine motion estimator for determining whether each of the plurality of portions of the reference picture is required or optional for the motion estimating of the current macroblock.

21. The system of claim 20, wherein the coarse motion estimator determines one or more portions for the current macroblock, and one or more portions for macroblocks neighboring the current macroblock using motion vectors, and wherein the requested plurality of portions comprises the one or more portions for the current macroblock and the one or more portions for the neighboring macroblocks.

22. The system of claim 19, wherein the motion estimator is configured to wait to receive all of the required portions before performing the motion estimating and to perform the motion estimating regardless of whether all of the optional portions are received.

23. A circuit for requesting services, said circuit comprising:
   a controller for performing a function with requirements;
   a non-transitory computer readable medium storing a plurality of instructions, wherein execution of the plurality of instructions by the controller causes:
      making a plurality of requests associated with the requirements of the function to a serving entity, the plurality of requests including one or more required requests for one or more required data items required to meet the requirements of the function and one or more optional requests for one or more optional data items optional to meet the requirements of the function;
      providing an indicator with each of the requests indicating whether said request is required or optional to meet the requirements of the function;
      receiving all of the required data items in response to the required requests;
      receiving optional data items in response to at least one of the optional requests that have been selectively serviced based at least in part on a volume of the plurality of requests and at least one of an actual time and resource availability to accommodate the requests or an estimated time and resource availability to accommodate the requests, such that one or more of the optional requests are not serviced when the at least one of the actual time and resource availability or the estimated time and resource availability indicates insufficient time or resources are available to service all of the optional requests before a deadline for servicing the requests; and
      performing the function using all of the required data items and only those optional data items that have been received at a time to perform the function.

24. The circuit of claim 23, wherein the circuit comprises the serving entity and wherein the serving entity comprises a random access memory for servicing the requests that are indicated as required according to the real-time requirements, and selectively servicing the requests that are indicated as optional based at least in part on resource availability.

25. The circuit of claim 24, wherein the serving entity further comprises:
   a cache for receiving the requests and for servicing the requests that result in cache hits; and
   wherein the random access memory receives requests that are not serviced by the cache and services the requests that are not serviced by the cache and that are indicated as required, and selectively services the requests that are indicated as optional based on at least in part on resource availability.

26. The circuit of claim 25, wherein the serving entity selectively determines, based at least in part on resource availability, whether to service each of the requests that are indicated as optional.

27. The circuit of claim 25, wherein the serving entity selectively determines, based at least in part on resource availability, whether to service each of the requests that are not serviced by the cache that are indicated as optional.

28. The circuit of claim 23, wherein the circuit comprises the serving entity, wherein:
   the serving entity comprises a memory system for storing reference pictures; and
   the execution of the plurality of instructions stored in the non-transitory computer readable medium causes:
      motion estimating a current macroblock;
      requesting a plurality of portions of the reference pictures from the memory system to meet requirements of the motion estimating; and
      indicating whether each of the requested plurality of portions of the reference pictures is required or optional to meet the requirements of the motion estimating.

29. The circuit of claim 28, wherein the memory system provides each of the requested one or more portions that are indicated as required and selectively provides each of the requested one or more of portions that are indicated as optional.

30. The circuit of claim 28, wherein the memory system further comprises:
   a prediction cache configured to store certain portions of the reference pictures, to receive the requests for the plurality of portions, and to provide each requested portion of the plurality of portions that is among the certain portions stored in the prediction cache; and
   random access memory configured to:
      receive each request for a portion of the plurality of portions not among the certain portions;
      service each request for a portion not among the certain portions and indicated as required to meet the requirements of the motion estimating; and
      service, based at least in part on a volume of the plurality of requests and at least one of the actual time and resource availability to accommodate the requests or the estimated time and resource availability to accommodate the requests, one or more requests for portions not among the certain portions and indicated as optional to meet the requirements of the motion estimating, at least a portion of the requests for one or more of the optional portions discarded when the at least one of the actual time and resource availability or the estimated time and resource availability indicates insufficient time or resources are available to provide all of the optional portions before a deadline for servicing the requests.

31. The circuit of claim 30, wherein the memory system selectively determines, based at least in part on a volume of the plurality of requests and at least one of the actual time and resource availability to accommodate the requests or the estimated time and resource availability to accommodate the requests, whether to service each of the requests for a portion not among the certain portions and indicated as optional, the memory system configured to select the at least a portion of the requests for the optional portions to be discarded when the at least one of the actual time and resource availability or the estimated time and resource availability indicates insufficient time or resources are available to provide all of the optional portions before a deadline for servicing the requests.

32. The circuit of claim 28, wherein the memory system further comprises another non-transitory computer readable medium for storing a plurality of instructions, wherein execution of the plurality of instructions causes:
   selectively determining, based at least in part on a volume of the plurality of requests and at least one of the actual time and resource availability to accommodate the requests or the estimated time and resource availability to accommodate the requests, whether to service each of the requests for the plurality of portions of the reference pictures not among the certain portions and indicated as optional to meet the requirements of the motion estimating, the instructions configured to cause selecting the at least a portion of the requests for the optional portions to be discarded when the at least one of the actual time and resource availability or the estimated time and resource availability indicates insufficient time or resources are available to provide all of the optional portions before a deadline for servicing the requests.

33. The circuit of claim 28, wherein the plurality of instructions stored in the non-transitory computer readable medium comprises:
   a first plurality of instructions for identifying the plurality of portions of the reference pictures; and
   a second plurality of instructions for determining whether each of the plurality of portions of the reference picture is required or optional to meet the real-time requirements of the motion estimating.

34. The circuit of claim 33, wherein the execution of the first plurality of instructions identifies one or more portions for the current macroblock, and one or more portions for macroblocks neighboring the current macroblock using at least one motion vector, and wherein the requested plurality of portions comprises the one or more portions for the current macroblocks and the one or more portions for the neighboring macroblocks.

* * * * *